US010117297B1

(12) United States Patent
Wu et al.

(10) Patent No.: US 10,117,297 B1
(45) Date of Patent: Oct. 30, 2018

(54) APPARATUS, SYSTEMS, AND METHODS FOR REMOTELY DIMMING LIGHTS

(71) Applicant: Bitsysoft Technology Inc., Saratoga, CA (US)

(72) Inventors: Yung-Wen Wu, Saratoga, CA (US); Thomas Kuo Liu, San Jose, CA (US)

(73) Assignee: Bitsysoft Technology Inc., Saratoga, CA (US)

( * ) Notice: Subject to any disclaimer, the term of this patent is extended or adjusted under 35 U.S.C. 154(b) by 0 days.

(21) Appl. No.: 16/005,453

(22) Filed: Jun. 11, 2018

(51) Int. Cl.
*H05B 33/00* (2006.01)
*H05B 33/08* (2006.01)
*G06F 3/0484* (2013.01)
*H05B 37/02* (2006.01)

(52) U.S. Cl.
CPC ..... *H05B 33/0845* (2013.01); *G06F 3/04847* (2013.01); *H05B 37/0272* (2013.01)

(58) Field of Classification Search
CPC ............ H05B 33/0815; H05B 33/0845; H05B 37/0272; H05B 37/0227; H05B 37/0218; H05B 33/0809; H05B 33/0851; H05B 33/0854; H05B 33/0827; H05B 33/089; H05B 37/0245; H05B 33/0812; H05B 33/0818

See application file for complete search history.

(56) References Cited

U.S. PATENT DOCUMENTS

| | | |
|---|---|---|
| 6,700,333 B1 | 3/2004 | Hirshi et al. |
| 8,742,694 B2 | 6/2014 | Bora et al. |
| 9,078,313 B2 | 7/2015 | Recker et al. |
| 9,557,043 B2 | 1/2017 | Smith et al. |
| 9,806,810 B2 | 10/2017 | Raj et al. |
| 2007/0273290 A1 | 11/2007 | Ashdown et al. |
| 2013/0030589 A1 | 1/2013 | Pessina et al. |
| 2015/0100173 A1 | 4/2015 | Tubi et al. |
| 2017/0279630 A1 | 9/2017 | Anderson et al. |
| 2018/0112837 A1 | 4/2018 | Sadwick |

*Primary Examiner* — Monica C King
(74) *Attorney, Agent, or Firm* — Levine Bagade Han LLP

(57) ABSTRACT

Apparatus, systems, and methods for remotely dimming lights are disclosed. In one embodiment, a light-dimming apparatus for placement within a lighting enclosure of a lighting fixture is disclosed. The light-dimming apparatus can comprise an AC live input terminal, an AC neutral input terminal, an AC live output terminal, an AC neutral output terminal, a dimmer module, and a microcontroller unit comprising a plurality of wireless communication modules, a first processor core, and a second processor core. The first processor core can be programmed to execute instructions to receive a dimming command from another device via at least one of the plurality of wireless communication modules and the second processor core can be programmed to execute further instructions to receive zero-crossing signals from the dimmer module and transmit switching signals to the dimmer module to modulate the power supplied to the lighting load to dim the brightness of the lighting load.

20 Claims, 9 Drawing Sheets

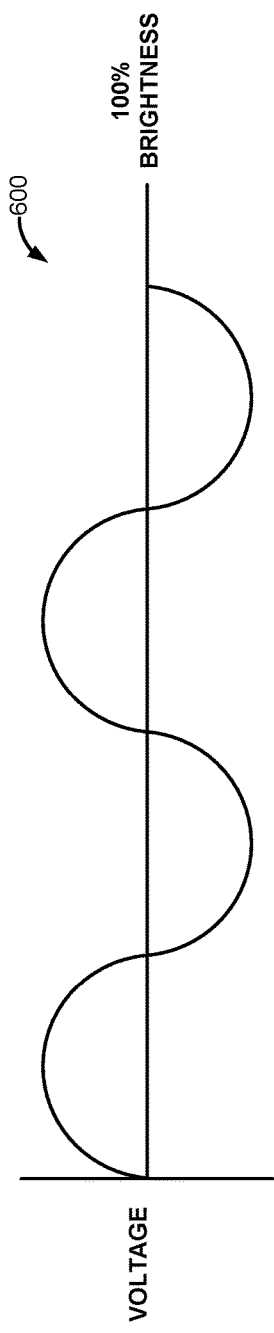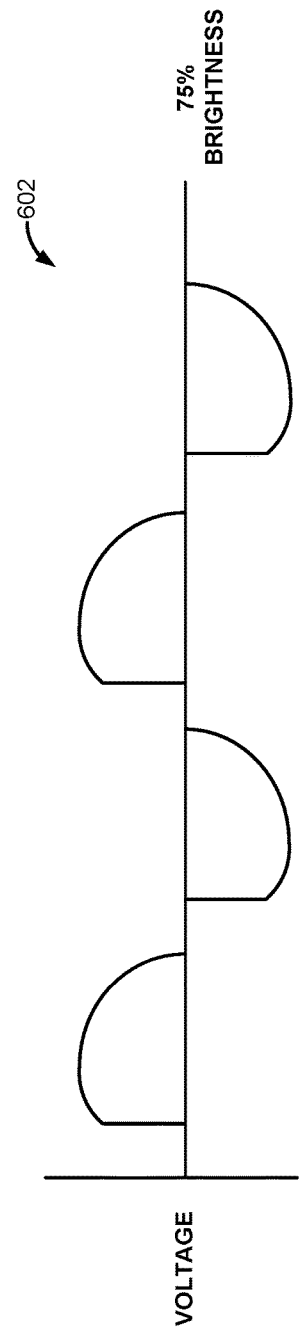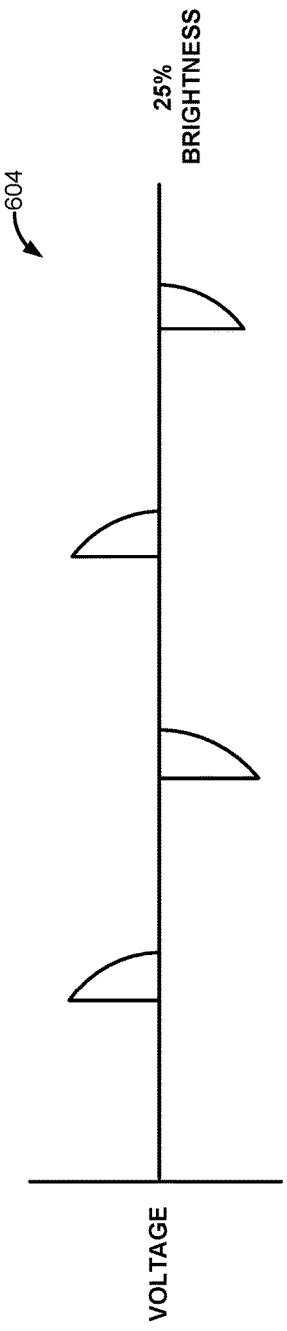

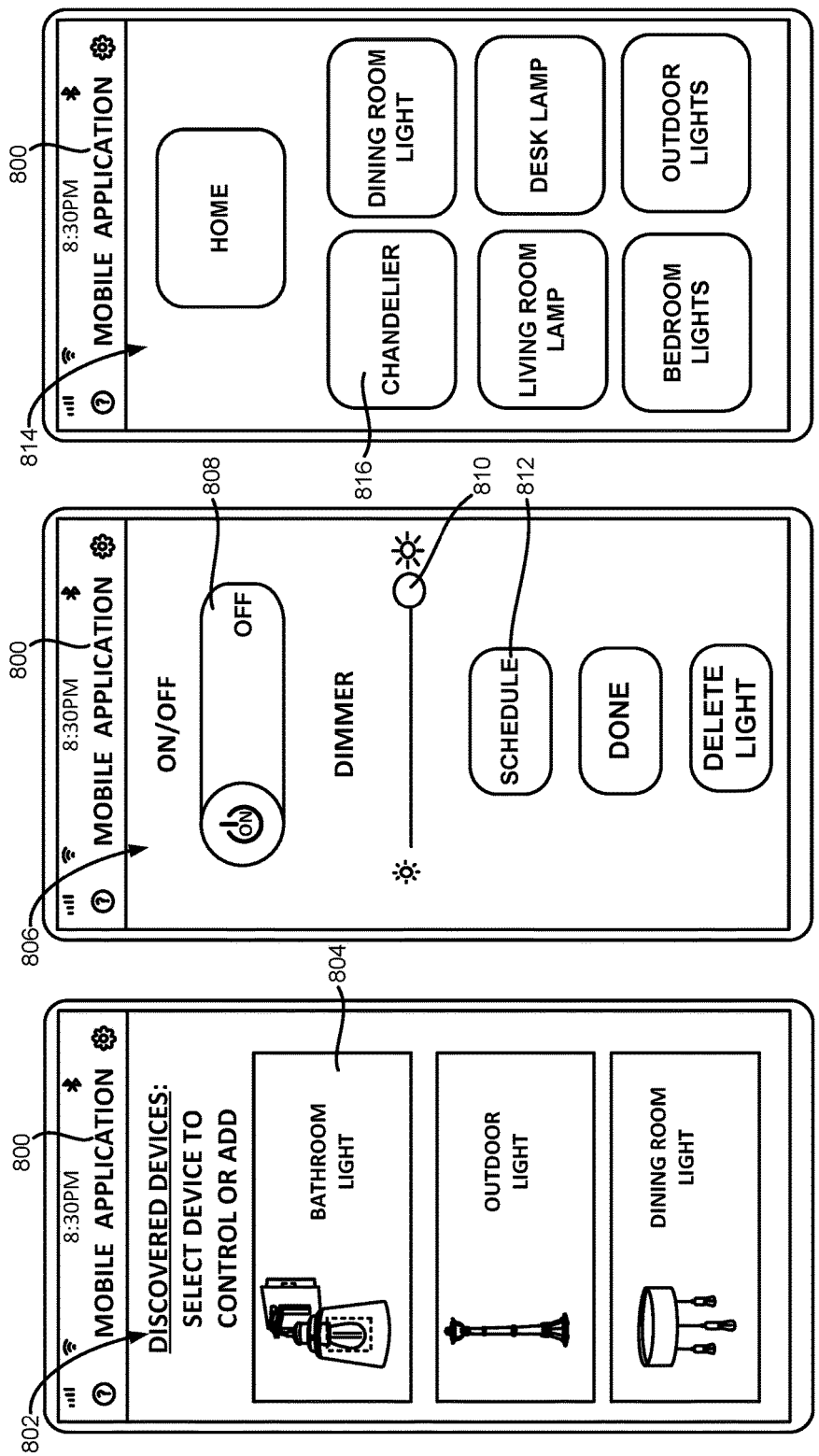

APPARATUS, SYSTEMS, AND METHODS FOR REMOTELY DIMMING LIGHTS

TECHNICAL FIELD

This disclosure relates generally to the field of commercial and residential lighting devices and systems, more specifically, to improved apparatus, systems, and methods for remotely dimming alternating current (AC) powered lights.

BACKGROUND

The ability to be able to control one's lights remotely using a smartphone, tablet, or other mobile device is a relatively new phenomenon that will become more commonplace as the smart home or smart office concept is embraced by more appliance and device manufacturers. Such control can include the ability to remotely dim one or more lights within a person's home or office, turn on or off such lights, or even schedule such actions for certain times of the day or night. These devices often fall into three general categories including wirelessly connected lightbulbs, outlets, and light switches. However, all such devices are beset with shortcomings that have heretofore not been addressed by the makers of such devices.

For example, wirelessly connected lightbulbs or smart lightbulbs, such as the Philips Hue™ lightbulbs, often require the user to purchase an expensive bridge or hub device in order to connect such bulbs to the user's wireless local area network (WLAN). Moreover, each smart lightbulb is often three or four times the price of an equivalent lightbulb that does not possess such wireless connectivity. Furthermore, many users have complained that such smart lightbulbs are prone to flickering or producing a buzzing noise compared to regular lightbulbs.

Wirelessly connected light-dimming wall outlets, such as the GE Plug-In Smart Dimmer™, also require the user to purchase an expensive hub device in order to connect such outlets to the user's WLAN. Moreover, light-dimming wall outlets often lose their wireless connection to the hub device, which requires the user to manually reset the wall outlet and provision the outlet once again. In addition, such light-dimming wall outlets can only be used with tabletop or floor lights that have an electrical cord. Furthermore, many users have complained that lights plugged into such light-dimming wall outlets tend to also flicker or produce a buzzing noise compared to lights not plugged into such outlets.

While certain wirelessly connected dimmer switches, such as the WeMo™ Dimmer Light Switch by Belkin International, Inc., do not require an additional hub device to connect to a user's WLAN, such dimmer switches are difficult to install and may require the user to hire a trained professional to replace the user's current light switch with the wirelessly connected dimmer switch. Moreover, such dimmer switches often lose their connection to the user's WLAN, resulting in the user having to physically reset the dimmer switch or re-provision the dimmer switch.

Therefore, an improved light dimming solution is needed which addresses the challenges faced by current light controlling devices. In addition, such a solution should provide added security benefits and work well with all types of light fixtures and corded lights. Moreover, such a solution should not be overly complex and cost-effective to manufacture.

SUMMARY

Apparatus, systems, and methods for remotely dimming lights are disclosed. In one embodiment, a light-dimming apparatus for placement within a lighting enclosure of a light fixture is disclosed. The lighting enclosure can comprise at least one of a canopy of the light fixture, a sconce of the light fixture, a flush-mount of the light fixture, a shade holder of the light fixture, and an electrical distribution box of an outdoor light.

The light-dimming apparatus can comprise an AC live input terminal configured to couple to an AC live input wire from a power source, an AC neutral input terminal configured to couple to an AC neutral input wire from the power source, an AC live output terminal configured to couple to an AC live output wire coupled to a lighting load, and an AC neutral output terminal configured to couple to an AC neutral output wire coupled to the lighting load. The lighting load can comprise at least one of an incandescent light bulb, a halogen light bulb, a dimmable light-emitting diode (LED) light bulb, and a dimmable compact fluorescent lamp (CFL) light bulb.

The light-dimming apparatus can also comprise a microcontroller unit comprising a plurality of wireless communication modules, a first processor core, a second processor core, and a memory. The plurality of wireless communication modules can comprise a wireless-fidelity (WiFi) module and a Bluetooth™ module. The first processor core and the second processor core of the microcontroller unit can each be a 32-bit microprocessor operating at a clock frequency of between 160 MHz and 240 MHz.

In addition, the light-dimming apparatus can also comprise an alternating current-to-direct current (AC-to-DC) buck converter coupled to the AC live input terminal, the AC neutral input terminal, and the microcontroller unit. The AC-to-DC buck converter can be configured to deliver power to the microcontroller unit. Moreover, the light-dimming apparatus can also comprise a dimmer module configured to detect a zero-crossing signal and modulate power supplied to the lighting load.

The dimmer module can further comprise a full bridge rectifier electrically coupled to at least the AC live input terminal and the AC neutral input terminal, a first optocoupler electrically coupled to at least the full bridge rectifier and the microcontroller unit, a bidirectional triode thyristor coupled to at least the AC live output terminal, and a second optocoupler coupled to at least the microcontroller unit and the bidirectional triode thyristor.

The first processor core can be programmed to execute instructions stored in the memory of the microcontroller unit to pin a plurality of wireless communication tasks to the first processor core such that the wireless communication tasks are handled only by the first processor core. In addition, the second processor core can be programmed to execute additional instructions stored in the memory of the microcontroller unit to pin a plurality of zero-crossing tasks to the second processor core such that zero-crossing interrupts are handled only by the second processor core.

The first processor core of the microcontroller unit can be programmed to execute instructions stored in the memory of the microcontroller unit to receive a dimming command comprising a dimming value from another device via at least one of the plurality of wireless communication modules to dim a brightness of the lighting load. The second processor core of the microcontroller unit can be programmed to execute further instructions stored in the memory of the microcontroller unit to receive zero-crossing signals from the dimmer module and transmit a plurality of switching signals to the second optocoupler to work with the bidirectional triode thyristor to modulate the power supplied to the lighting load to dim the brightness of the lighting load according to the dimming value.

The first processor core can be programmed to execute further instructions to receive a service set identifier (SSID) of a wireless local area network (WLAN) and a network key associated with the SSID from a client device communicatively coupled to the microcontroller unit over a Bluetooth™ communication protocol via the Bluetooth™ module and store the SSID and the network key in the memory of the microcontroller unit. The first processor core can also be programmed to execute instructions to wirelessly connect to the WLAN using the SSID and the network key. The first processor core can be programmed to execute further instructions to instruct the Bluetooth™ module to cease communication services upon successfully connecting to the WLAN, and receive the dimming command comprising the dimming value from a server over a WiFi communication protocol.

The second processor core can be programmed to execute instructions stored in the memory of the microcontroller unit to receive the zero-crossing signals from the dimmer module and transmit the plurality of switching signals to the second optocoupler to work with the bidirectional triode thyristor to modulate the power supplied to the lighting load to dim the brightness of the lighting load according to the dimming value received from the server.

For example, the first processor core can be programmed to execute further instructions stored in the memory of the microcontroller unit to instruct the Bluetooth™ module to cease communication services by ceasing a plurality of Generic Attribute Profile (GATT) services undertaken by the Bluetooth™ module.

The first processor core can be programmed to execute additional instructions stored in the memory of the microcontroller unit to detect that the WiFi module is disconnected from the WLAN, instruct the Bluetooth™ module to resume communication services upon detecting that the WiFi module is disconnected from the WLAN, broadcast a device name of the light-dimming apparatus to client devices within range of the Bluetooth™ module while simultaneously attempting to wirelessly reconnect to the WLAN using the SSID and the network key stored in the memory of the microcontroller unit, wirelessly reconnect to the WLAN using the SSID and the network key stored in the memory of the microcontroller unit, and instruct the Bluetooth™ module to once again cease communication services upon successfully connecting to the WLAN.

The first processor core can also be programmed to execute further instructions stored in the memory of the microcontroller unit to detect that the WiFi module is disconnected from the WLAN, instruct the Bluetooth™ module to resume communication services upon detecting that the WiFi module is disconnected from the WLAN, and receive another dimming command comprising another dimming value from the same client device or another client device wirelessly connected to the light-dimming apparatus via the Bluetooth™ module. In this embodiment, the second processor core can be programmed to execute additional instructions stored in the memory of the microcontroller unit to receive other zero-crossing signals from the dimmer module and transmit additional switching signals to the second optocoupler to work with the bidirectional triode thyristor to modulate the power supplied to the lighting load to dim the brightness of the lighting load according to the dimming value received from the same client device or another client device.

A lighting system is also disclosed comprising a light socket configured to couple to a lighting load, a lighting enclosure coupled to the light socket. The lighting enclosure can be configured to house the aforementioned light-dimming apparatus.

A method of dimming a light is also disclosed. The method can comprise using a first processor core of the microcontroller unit to execute instructions stored in a memory of a microcontroller unit of the aforementioned light-dimming apparatus to receive a dimming command comprising a dimming value via at least one of a wireless-fidelity (WiFi) module and a Bluetooth™ module of the microcontroller unit from another device to dim a brightness of a lighting load. The method can further comprise using a second processor core of the microcontroller unit to execute further instructions stored in the memory of the microcontroller unit to receive zero-crossing signals from a dimmer module and transmit a plurality of switching signals to the second optocoupler to work with the bidirectional triode thyristor to modulate the power supplied to the lighting load to dim the brightness of the lighting load according to the dimming value.

The method can further comprise using the first processor core to execute instructions stored in the memory of the microcontroller unit to receive a SSID of a WLAN and a network key associated with the SSID from a client device communicatively coupled to the microcontroller unit over a Bluetooth™ communication protocol via the Bluetooth™ module and store the SSID and the network key in the memory of the microcontroller unit. The method can also comprise using the first processor core to execute instructions stored in the memory of the microcontroller unit to wirelessly connect to the WLAN using the SSID and the network key and instruct the Bluetooth™ module to cease communication services upon successfully connecting to the WLAN. The first processor core can turn off the Bluetooth™ module by ceasing a plurality of Generic Attribute Profile (GATT) services undertaken by the Bluetooth™ module.

The method can further comprise receiving the dimming command comprising the dimming value from a server over a WiFi communication protocol and using the second processor core to execute instructions stored in the memory of the microcontroller unit to receive zero-crossing signals from the dimmer module and transmit the plurality of switching signals to the second optocoupler to work with the bidirectional triode thyristor to modulate the power supplied to the lighting load to dim the brightness of the lighting load according to the dimming value received from the server.

The method can further comprise using the first processor core to execute instructions stored in the memory of the microcontroller unit to detect that the WiFi module is disconnected from the WLAN, instruct the Bluetooth™ module to resume communication services upon detecting that the WiFi module is disconnected from the WLAN, broadcast a device name of the light-dimming apparatus to client devices within range of the Bluetooth™ module while simultaneously attempting to wirelessly reconnect to the WLAN using the SSID and the network key stored in the memory of the microcontroller unit, wirelessly reconnect to the WLAN using the SSID and the network key stored in the memory of the microcontroller unit, and instruct the Bluetooth™ module to once again cease communication services upon successfully connecting to the WLAN.

The method can further comprise using the first processor core to execute instructions stored in the memory of the microcontroller unit to detect that the WiFi module is disconnected from the WLAN, instruct the Bluetooth™ module to resume communication services upon detecting that the WiFi module is disconnected from the WLAN, and receive another dimming command comprising another dimming value from the same client device or another client device wirelessly connected to the light-dimming apparatus via the Bluetooth™ module. The method can also comprise using the second processor core to execute instructions stored in the memory of the microcontroller unit to receive zero-crossing signals from the dimmer module and transmit switching signals to the second optocoupler to work with the bidirectional triode thyristor to modulate the power supplied to the lighting load to dim the brightness of the lighting load according to the dimming value received from the same client device or another client device.

BRIEF DESCRIPTION OF THE DRAWINGS

FIGS. 6A to 6C illustrate example waveforms of alternating current being phase controlled by the light-dimming apparatus.

FIGS. 8A to 8C illustrate example graphical user interfaces (GUIs) of a mobile application controlling the light-dimming apparatus.

DETAILED DESCRIPTION OF THE INVENTION

Figure 1A:
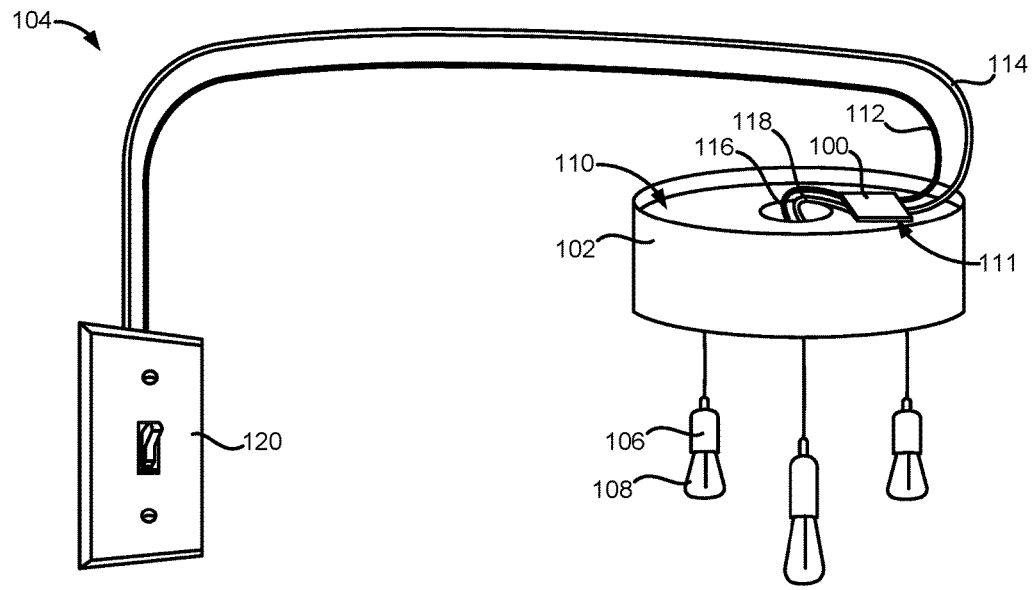
FIG. 1A illustrates an embodiment of a light-dimming apparatus placed within a canopy of a ceiling mounted light fixture.

FIG. 1A illustrates an embodiment of a light-dimming apparatus 100 placed within a lighting enclosure 102 of a lighting system 104. As shown in FIG. 1A, the lighting enclosure 102 can be a canopy of a ceiling mounted light fixture. The ceiling mounted light fixture can be considered an embodiment of the lighting system 104. The lighting system 104 can also comprise one or more light sockets 106 configured to couple to or receive a lighting load 108. In some embodiments, the lighting load 108 can be an alternating current-powered (AC-powered) lighting load such as an incandescent lamp 200 or lightbulb (see FIG. 2), a halogen lamp 206 or lightbulb (see FIG. 2), a dimmable LED lamp 204 or lightbulb comprising an AC-DC LED driver (see FIG. 2), or a dimmable compact fluorescent lamp (CFL) 202 or lightbulb comprising a dimmable CFL ballast (see FIG. 2). In other embodiments, the lighting load 108 can be a driverless AC-LED lamp or lightbulb. For purposes of this disclosure, the terms "lamp" and "lightbulb" are used interchangeably to refer to an electric-powered element comprising a transparent or translucent housing, a base or connector portion, and any embedded electronic components within the base or connector portion.

FIG. 1A illustrates that the light-dimming apparatus 100 can be placed within a recess 110 or cavity of the lighting enclosure 102. The light-dimming apparatus 100 can be affixed or otherwise coupled to one or more surfaces within the lighting enclosure 102 by fasteners, adhesives, hook-and-loop fasteners (e.g., Velcro®), soldering, or a combination thereof. For example, the light-dimming apparatus 100 can be placed within the recess 110 of a canopy or flush-mount of a ceiling-mounted light fixture. The light-dimming apparatus 100 can comprise an apparatus housing 111. The apparatus housing 111 can be shaped to conform to the recess 110 of the lighting enclosure 102. For example, the apparatus housing 111 can be shaped substantially as a cuboid, an ovoid, a conic or frustoconic, a cylinder, or a combination thereof. In one embodiment, the apparatus housing 111 can be a cuboid having a length dimension of approximately 6.0 cm, a width dimension of approximately 5.0 cm, and a height dimension of approximately 1.5 cm. The apparatus housing 111 can be small enough to fit within the lighting enclosure 102 of most standard-sized lighting fixtures.

The light-dimming apparatus 100 can be coupled in series electrical connection with input wires from an AC power supply, such as the mains power of a residential or commercial building (e.g., 120V/240V and 60 Hz, 230V/240V and 50 Hz, 220V and 50 Hz, 100V and 50 Hz/60 Hz, 120V and 60 Hz, etc.) and the output wires to the lighting load 108. In the example embodiment shown in FIG. 1A, the light-dimming apparatus 100 can be coupled to an AC live input wire 112 and an AC neutral input wire 114 of the AC power supply and an AC live output wire 116 and an AC neutral output wire 118 coupled to the lighting load 108.

The AC live input wire 112 and the AC neutral input wire 114 can also be coupled to a wall-mounted lighting control 120. In some embodiments, the wall-mounted lighting control 120 can comprise a light switch such as a single-pole switch, a double-pole switch, a three-way switch, or a four-way switch. In these embodiments, the wall-mounted lighting control 120 can be implemented as a toggle switch, a rocker switch, a push-buttons switch, or a specialty switch. In other embodiments, the wall-mounted lighting control 120 can comprise a single-pole dimmer, a three-way dimmer, or a multi-location dimmer.

One advantage of the lighting system 104 and the light-dimming apparatus 100 disclosed herein is the compatibility of the system 104 and apparatus 100 with different types of wall-mounted lighting controls. For example, a user can replace an existing light-fixture with the lighting system 104 disclosed herein without having to replace the wall-mounted lighting control 120 currently in place. Moreover, the user can dim one or more lighting loads 108 coupled to the newly installed lighting system 104 even when the existing wall-mounted lighting control 120 is not a dimmer-type control.

Figure 1B:
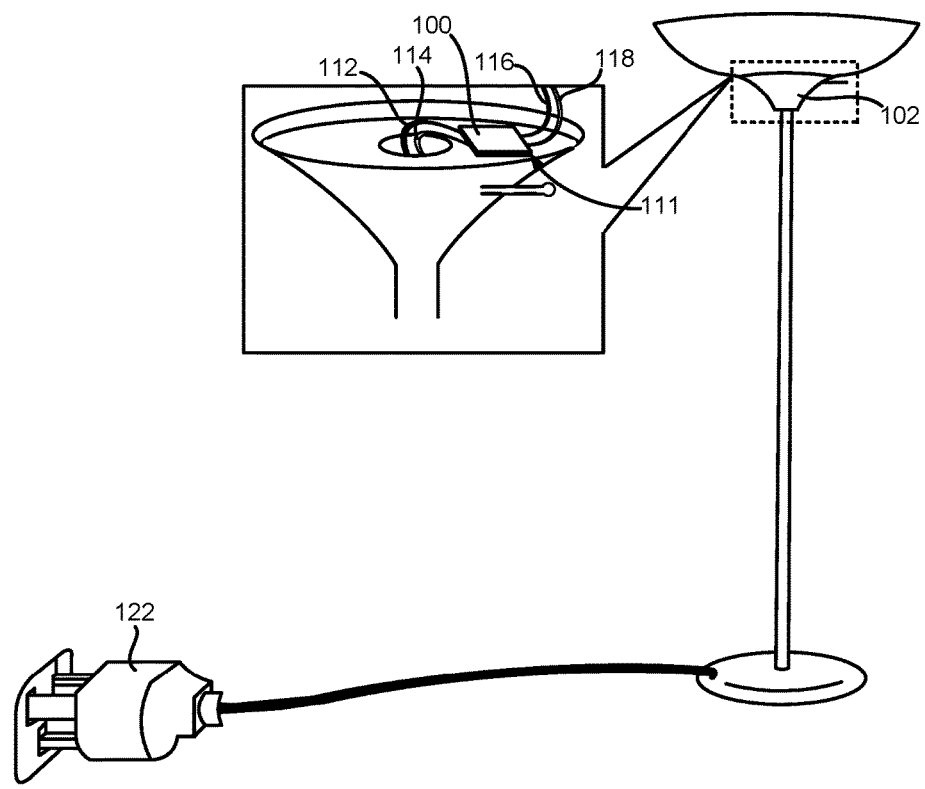
FIG. 1B illustrates the light-dimming apparatus placed within a shade holder of a torchiere floor light.

FIG. 1B illustrates the light-dimming apparatus 100 placed within a shade holder of a standalone light (e.g., a torchiere floor light) having an AC power plug 122. The standalone light having the AC power plug 122 can be considered an embodiment of the lighting system 104 and the shade holder can be considered an embodiment of the lighting enclosure 102. Although FIG. 1B shows the shade holder as part of a standalone light, it is contemplated by this disclosure and it should be understood by one of ordinary skill in the art that the shade holder can also be part of a wall-mounted or ceiling-mounted light fixture.

One advantage of the lighting system 104 and the light-dimming apparatus 100 disclosed herein is the compatibility of the system 104 and apparatus 100 with standalone lights and fixed lighting structures. For example, a lighting manufacturer can install similar instances of the light-dimming apparatus 100 within the lighting enclosure 102 (e.g., a canopy or flush-mount) of a wall-mounted or ceiling-mounted light fixture and the lighting enclosure 102 (e.g., a shade holder) of a standalone light powered via an AC power plug 122. This makes the light-dimming apparatus 100 a cost-effective solution for lighting manufacturers intending to convert various types of non-connected lights or light fixtures into wirelessly-connected lights or light fixtures.

Figure 2:
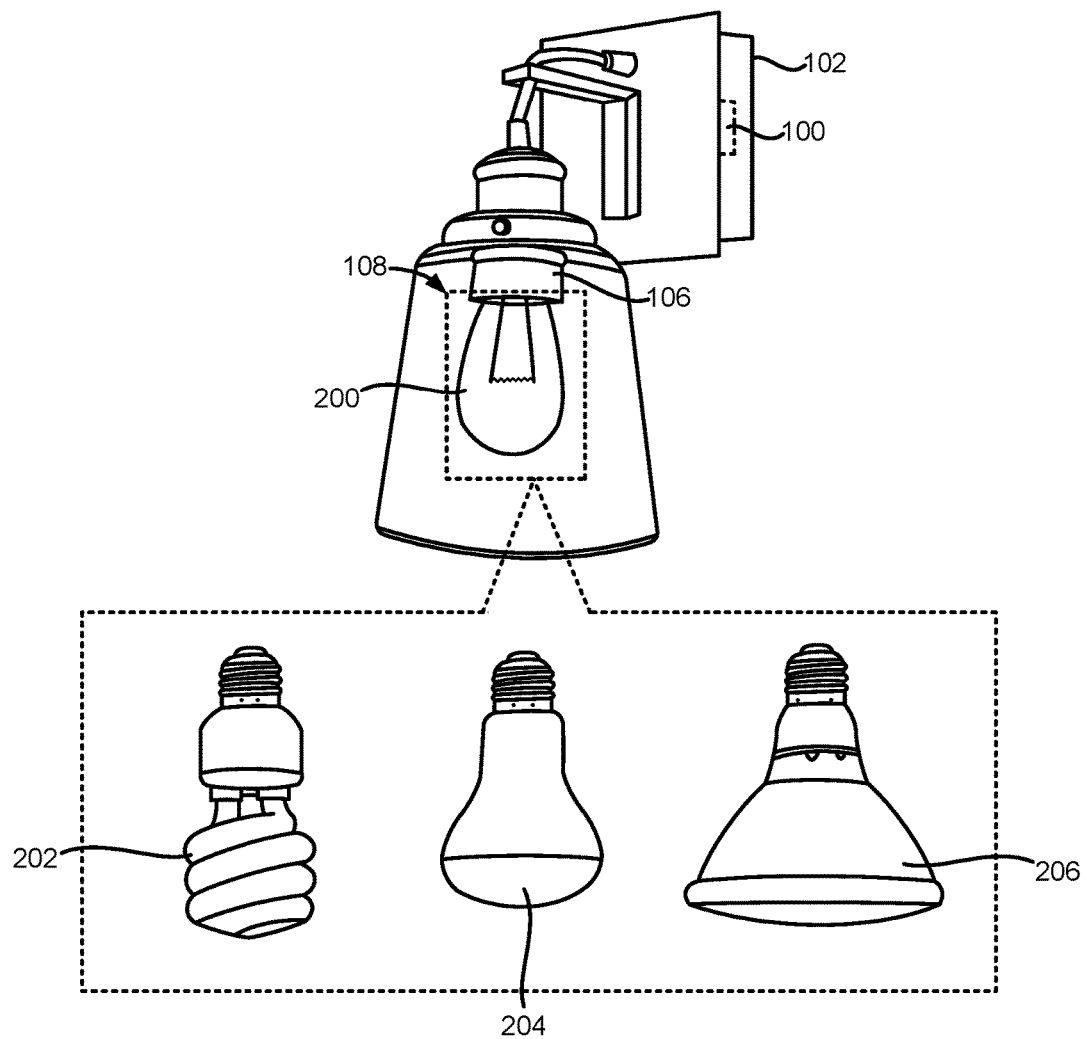
FIG. 2 illustrates the light-dimming apparatus placed within a sconce of a wall-mounted light fixture.

FIG. 2 illustrates the light-dimming apparatus 100 placed within a sconce of a wall-mounted light fixture. The wall-mounted light fixture can be considered an embodiment of the lighting system 104 and the sconce can be considered an embodiment of the lighting enclosure 102. As previously discussed, the light-dimming apparatus 100 can modulate power supplied to a lighting load 108. The lighting load 108 can comprise an incandescent lamp 200, a dimmable CFL 202 comprising a CFL ballast, a dimmable LED lamp 204 comprising an AC-DC LED driver, or a halogen lamp 206 (see FIG. 2).

One advantage of the lighting system 104 and the light-dimming apparatus 100 disclosed herein is the compatibility of the system 104 and apparatus 100 with various kinds of lightbulbs or lamps. Moreover, the system 104 and apparatus 100 disclosed herein does not require the user to purchase expensive "smart" lightbulbs and hubs in order to remotely dim such lightbulbs or lamps.

Figure 3:
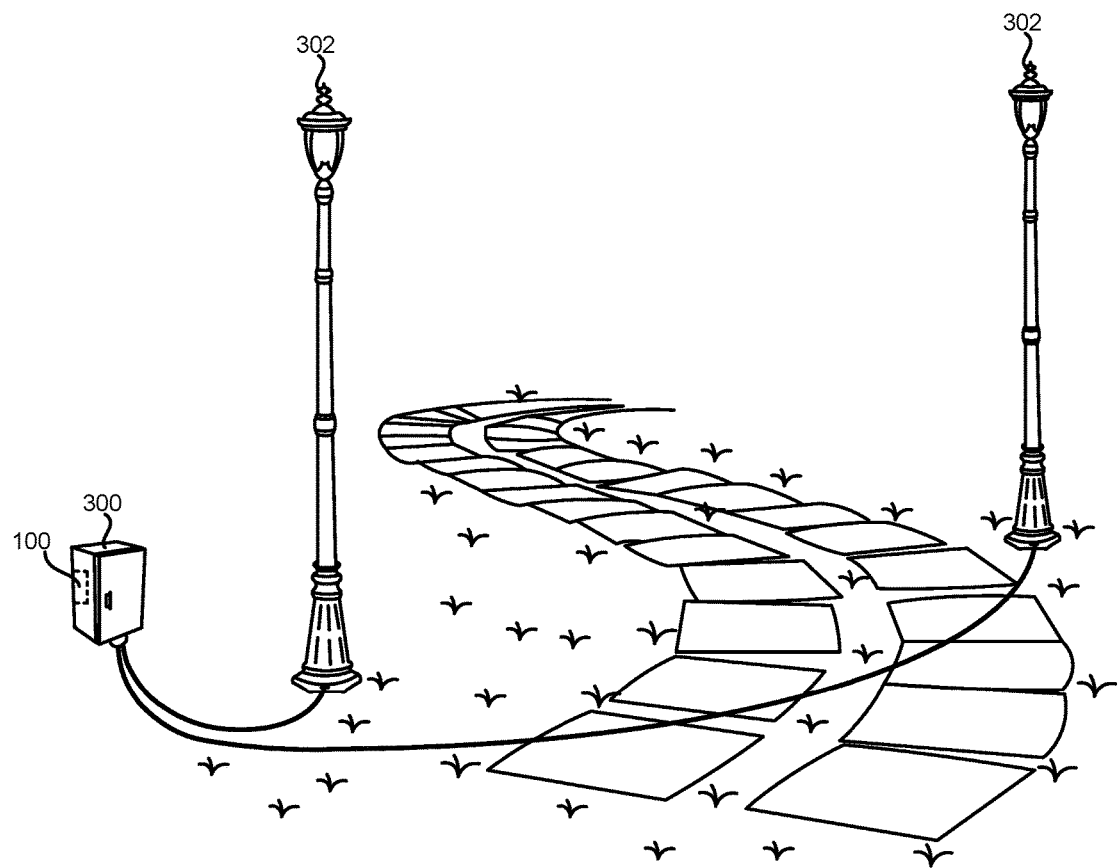
FIG. 3 illustrates the light-dimming apparatus placed within an electrical distribution box of an outdoor lighting system.

FIG. 3 illustrates the light-dimming apparatus 100 placed within an electrical distribution box 300 coupled to one or more outdoor lights 302. For example, the light-dimming apparatus 100 can be coupled to an AC live input wire 112 and an AC neutral input wire 114 (not shown in FIG. 3) of the AC power supply and an AC live output wire 116 and an AC neutral output wire 118 (not shown in FIG. 3) coupled to the one or more outdoor lights 302. As shown in FIG. 3, the light-dimming apparatus 100 can be used to remotely control one or more outdoor lights 302.

Figure 4:
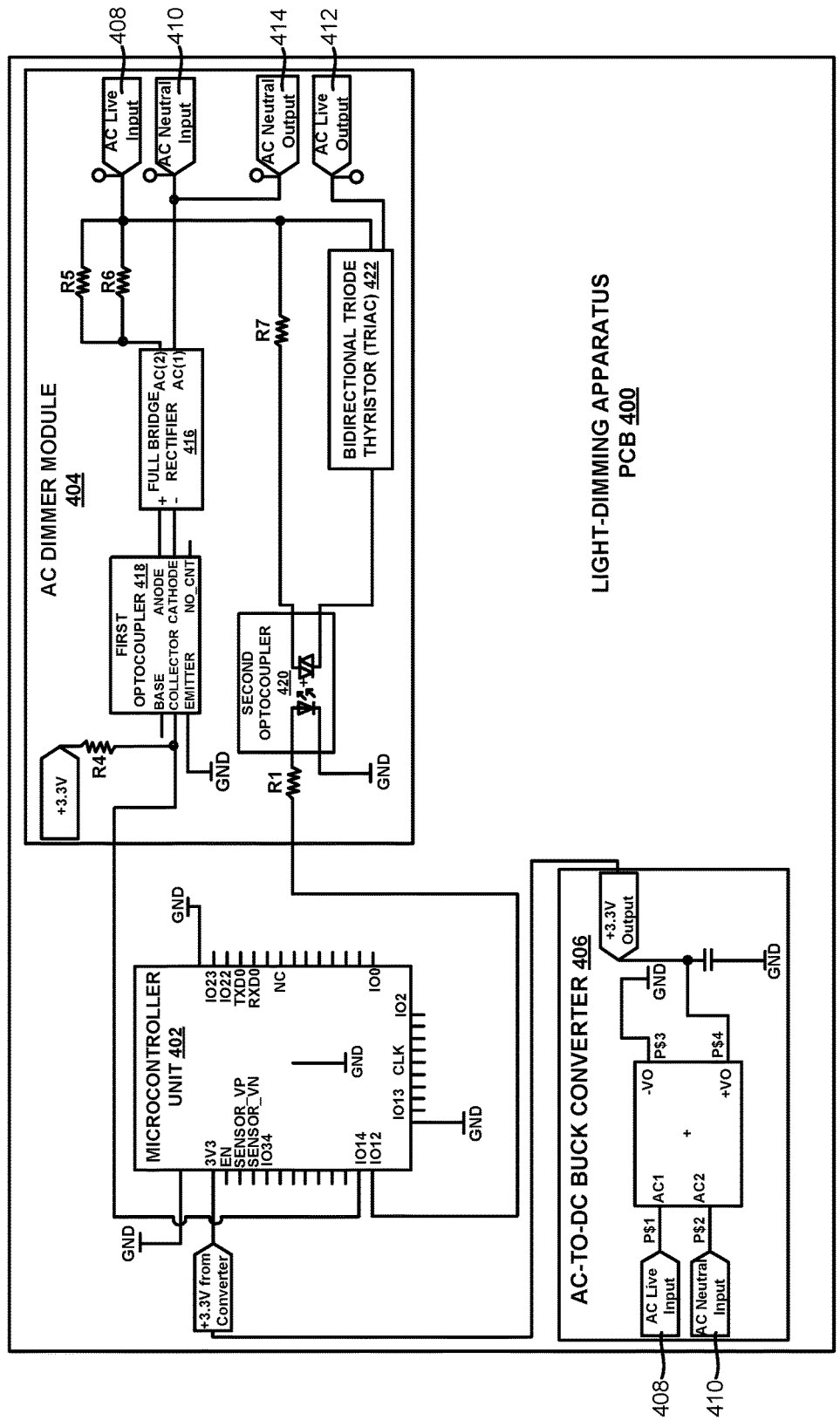
FIG. 4 is a schematic showing certain electronic components of the light-dimming apparatus coupled to a printed circuit board (PCB).

FIG. 4 is a schematic showing certain electronic components of the light-dimming apparatus 100 coupled to a PCB 400 within the apparatus housing 111. As depicted in FIG. 4, the light-dimming apparatus 100 can comprise a microcontroller unit 402, an AC dimmer module 404, an alternating current-to-direct current (AC-to-DC) buck converter 406, an AC live input terminal 408, an AC neutral input terminal 410, an AC live output terminal 412, and an AC neutral output terminal 414 coupled to the PCB 400.

The AC live input terminal 408 can be configured to couple to an AC live input wire 112 (see, for example, FIGS. 1A and 1B, also referred to as a "hot wire") from a power source such as an AC mains power. The AC neutral input terminal 410 can be configured to couple to an AC neutral input wire 114 (see, for example, FIGS. 1A and 1B, also referred to as a "neutral wire"). The AC neutral input wire can be coupled to ground at a breaker box of a residential or commercial building. In some embodiments, the AC live input wire 112 and the AC neutral input wire 114 can be wires extending through the walls or ceiling of a residential or commercial building (see FIG. 1A). In other embodiments, the AC live input wire 112 and the AC neutral input wire 114 can be the hot and neutral wires, respectively, of an AC power cord.

The AC live output terminal 412 can be configured to couple to an AC live output wire 116 coupled to the lighting load 108 (see, for example, FIGS. 1A and 1B). The AC neutral output terminal 414 can be configured to couple to an AC neutral output wire 118 coupled to the lighting load 108 (see, for example, FIGS. 1A and 1B).

Figure 5:
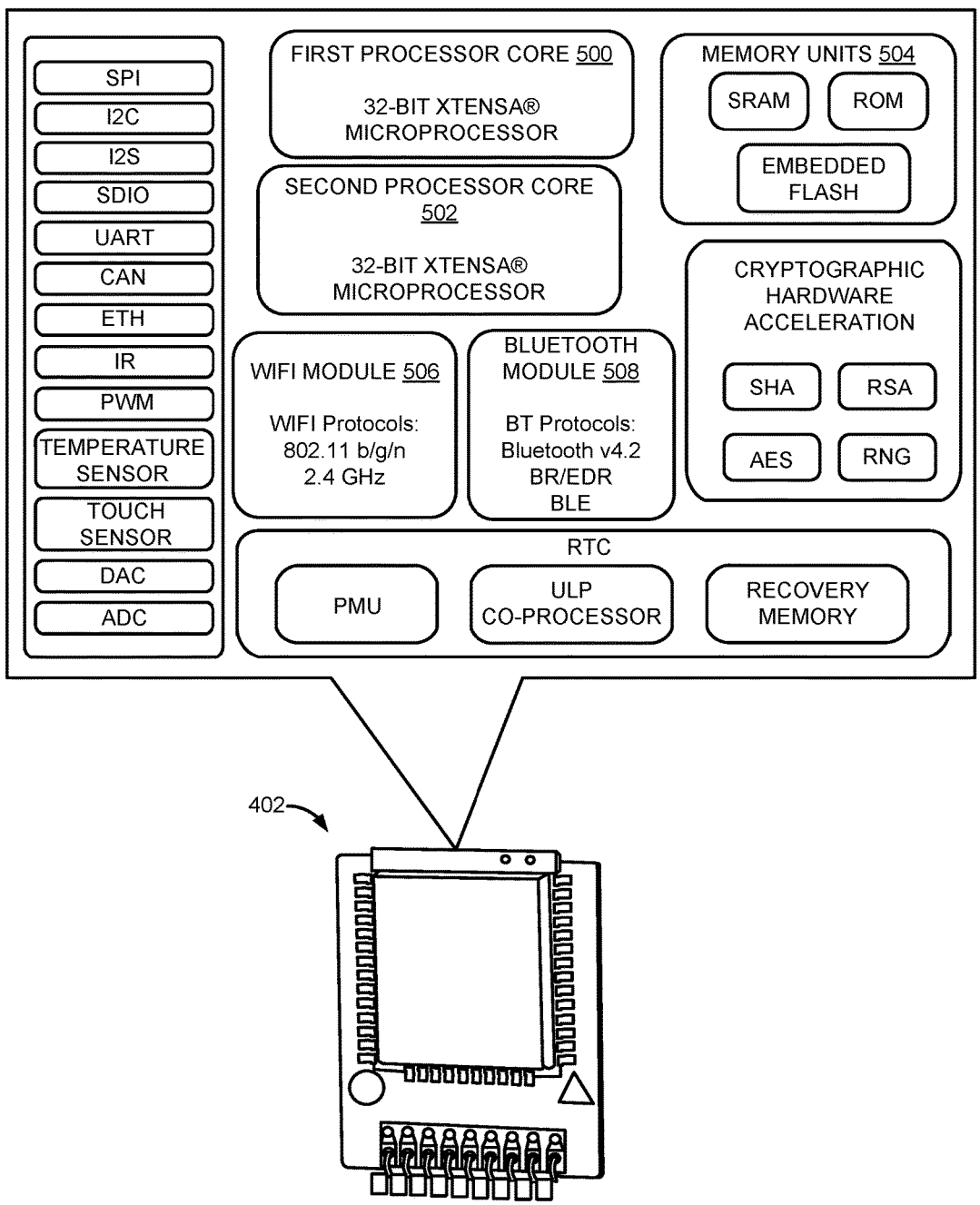
FIG. 5 illustrates an embodiment of a microcontroller unit of the light-dimming apparatus.

The microcontroller unit 402 can comprise a plurality of wireless communication modules including a WiFi module 506 (see FIG. 5) and a Bluetooth™ module 508 (see FIG. 5), a first CPU or processor core 500 (see FIG. 5), a second CPU or processor core 502 (see FIG. 5), and a plurality of memory units 504 (see FIG. 5). As will be discussed in more detail in the following sections, the first processor core 500 can be programmed to execute instructions stored in the one or more memory units 504 to handle communication via the WiFi module 506 and the Bluetooth™ module 508. For example, the first processor core 500 can be programmed to execute instructions to receive a dimming command 712 comprising a dimming value 714 (see FIGS. 7B and 7C) from another device via one of the wireless communication modules. The second processor core 502 can be programmed to execute instructions stored in the one or more memory units 504 to handle zero-crossing interrupts and control the AC dimmer module 404 to modulate power supplied to the lighting load 108 to dim the brightness of the lighting load 108 according to the dimming value 714. The two processor cores can operate independently such that communication tasks are not interrupted by dimming tasks, and vice versa.

In one embodiment, the microcontroller unit 402 can be an ESP32-WROOM-32 microcontroller unit developed by Espressif Systems (Shanghai) Pte., Ltd. In this embodiment, the first processor core 500 and the second processor core 502 can each be a 32-bit microprocessor such as the Xtensa® LX6 microprocessor from Cadence Design Systems, Inc.

The microcontroller unit 402 can be powered by the AC-to-DC buck converter 406. The AC-to-DC buck converter 406 can be coupled to the AC live input terminal 408 and the AC live input terminal 408. The AC-to-DC buck converter 406 can be configured to convert AC mains power to a 3.3V DC voltage capable of powering the microcontroller unit 402 and other electronic components. The AC-to-DC buck converter 406 can have a rated input voltage of between 100V and 240V. The AC-to-DC buck converter 406 can have a load rated output voltage of +3.3V±0.1V. In one embodiment, the AC-to-DC buck converter 406 can be an HLK-PM03 converter developed by Shenzhen Hi-Link Electronic Co., Ltd.

The microcontroller unit 402 can be coupled to and control the AC dimmer module 404. The AC dimmer module 404 can comprise a full bridge rectifier 416, a first optocoupler 418, a second optocoupler 420, and a bidirectional triode thyristor 422 (or TRIAC).

The full bridge rectifier 416 (also referred to as a full-wave bridge rectifier) can rectify the AC mains power received through the input wires. The full bridge rectifier 416 can be electrically coupled or connected to the AC live input terminal 408 and the AC neutral input terminal 410. The full bridge rectifier 416 can serve as part of a zero-crossing detector (along with the first optocoupler 418) of the AC dimmer module 404. The full bridge rectifier 416 can output a rectified waveform to the first optocoupler 418. In one embodiment, the full bridge rectifier 416 can be an MB4S Bridge Rectifier developed by Vishay Intertechnology, Inc.

The first optocoupler 418 (also referred to as an opto-isolator) can be electrically coupled or connected to at least the full bridge rectifier 416 and the microcontroller unit 402. In some embodiments, the first optocoupler 418 can comprise a gallium arsenide (GaAs) infrared emitting diode and a silicon photo-transistor. The diode can emit light until the AC voltage nears the zero-crossing line, once this occurs, the silicon photo-transistor can output a zero-crossing signal to the microcontroller unit 402. In one embodiment, the first optocoupler 418 can be a 4N25SR2M Phototransistor Optocoupler developed by Semiconductor Component Industries, LLC (d/b/a ON Semiconductor).

The AC dimmer module 404 can also comprise the second optocoupler 420 coupled to the microcontroller unit 402 and the bidirectional triode thyristor 422 (or TRIAC). The bidirectional triode thyristor 422 can be coupled to the AC live output terminal 412 and the AC neutral output terminal 414. The second optocoupler 420 can be used as an optically isolated TRIAC drive device. In some embodiments, the second optocoupler 420 can comprise a GaAs infrared emitting diode and a silicon bilateral switch.

In one embodiment, the second optocoupler 420 can be a MOC30121M TRIAC Driver Output Optocoupler developed by Semiconductor Component Industries, LLC (d/b/a ON Semiconductor). In this and other embodiments, the bidirectional triode thyristor 422 can be a BTA16-600BRG TRIAC device developed by STMicroelectronics International N.V.

The microcontroller unit 402 can be programmed to transmit a plurality of switching signals to the second optocoupler 420 to work with the bidirectional triode thyristor 422 to modulate the power supplied to the lighting load 108. For example, the second optocoupler 420 and the bidirectional triode thyristor 422 can work to cut power delivered to the lighting load 108 when the AC signal reaches the zero-crossing line. In addition, the microcontroller unit 402 can be programmed to send switching signals to the second optocoupler 420 via the bidirectional triode thyristor 422 to deliver power to the lighting load 108. In this manner, lower average power can be delivered to the lighting load 108 to dim the lighting load 108.

FIG. 5 illustrates an embodiment of the microcontroller unit 402 of the light-dimming apparatus 100. The microcontroller unit 402 can comprise a first CPU or processor core 500, a second CPU or processor core 502, a plurality of memory units 504, a WiFi module 506, and a Bluetooth™ module 508.

As previously discussed, in one embodiment, the microcontroller unit 402 can be an ESP32-WROOM-32 microcontroller unit developed by Espressif Systems (Shanghai) Pte., Ltd. In this embodiment, the first processor core 500 and the second processor core 502 can each be a 32-bit microprocessor such as the Xtensa® LX6 microprocessor from Cadence Design Systems, Inc. In some embodiments, the first processor core 500 and the second processor core 502 can each operate at a clock frequency of between about 160 MHz and 240 MHz. The two processor cores can be configured to operate independently such that tasks pinned to one processor core are not interrupted by tasks pinned to another processor core.

The memory units 504 can comprise read-only memory (ROM) (e.g., up to 448 kB of ROM for booting and core functions), on-chip static random-access memory (SRAM) (e.g., up to 520 kB of SRAM for data and instructions), flash memory (e.g., up to 16 MB of flash memory), or a combination thereof. Firmware instructions can be stored on one or more of the memory units 504 to operate the microcontroller unit 402 and the other electronic components of the light-dimming apparatus 100. In one embodiment, the firmware instructions can be written in the C programming language. In another embodiment, the firmware instructions can be written in the C++ programming language.

The WiFi module 506 can support a number of WiFi communication protocols including the IEEE 802.11b protocol, the IEEE 802.11g protocol, the IEEE 802.11n protocol, or a combination thereof. The WiFi module 506 can also support communications over the 2.4 GHz ISM band. The WiFi module 506 can allow the light-dimming apparatus 100 to wirelessly connect with a wireless networking device 706 (see FIGS. 7A to 7C) to communicate with one or more servers or client devices over a wide area network (WAN), such as the Internet.

The Bluetooth™ module 508 can support communications using a Bluetooth™ (IEEE 802.15.1) Basic Rate/Enhanced Data Rate (BR/EDR) protocol, a Bluetooth Low Energy (BLE) or Bluetooth Smart™ protocol, or a combination hereof. The Bluetooth™ module 508 can also support various features described in version 4.2 of the Core Bluetooth™ Specification. The Bluetooth™ module 508 can allow the light-dimming apparatus 100 to wirelessly communicate directly with a client device 700 (see FIGS. 7A to 7C) within range of the light-dimming apparatus 100 (for example, to provision the light-dimming apparatus 100 with credentials to connect to a wireless router). Moreover, the Bluetooth™ module 508 can also allow the client device 700 to transmit dimming commands directly to the light-dimming apparatus 100.

As previously discussed, the first processor core 500 can be programmed to exclusively handle wireless communication tasks while the second processor core 502 can be programmed to exclusively handle AC phase control or zero-crossing interrupt tasks. The first processor core 500 can be programmed to execute instructions stored in one or more memory units 504 of the microcontroller unit 402 to pin a plurality of wireless communication tasks (e.g., Bluetooth™ communications, WiFi communications, Hypertext Transfer Protocol (HTTP) tasks, or a combination thereof) to the first processor core 500 such that the wireless communication tasks are handled exclusively by the first processor core 500.

For example, the first processor core 500 can execute the following code in order to pin certain wireless communication tasks to the first processor core 500 (referred to below as core 0):

BLE: xTaskCreatePinnedToCore(btc_task, "Btc_task", BTC_TASK_STACK_SIZE, NULL, BTC_TASK_PRIO, &xBtcTaskHandle, 0);
http: xTaskCreatePinnedToCore(&http_get_task, "http_get_task", 4096, NULL, 5, NULL, 0);
System thread: result=xTaskCreatePinnedToCore(thread, name, stacksize, arg, prio, &CreatedTask, 0);
System timer: xReturn=xTaskCreatePinnedToCore(prvTimerTask, "Tmr Svc", (uint16_t) configTIMER_TASK_STACK_DEPTH, NULL, ((UBaseType_t) configTIMER_TASK_PRIORITY)|portPRIVILEGE_BIT, &xTimerTaskHandle, 0)

As a more specific example, the first processor core 500 can be programmed to execute instructions stored in the one or more memory units 504 to receive or request a dimming command 712 or instruction comprising a dimming value 714 (see FIGS. 7B and 7C) from a server 708 via the WiFi module 506 to dim a brightness of a lighting load 108. In addition, the first processor core 500 can be programmed to execute instructions stored in the one or more memory units 504 to receive a dimming command 712 or instruction comprising a dimming value 714 from a client device 700 via the Bluetooth™ module 508 to dim a brightness of a lighting load 108.

The second processor core 502 can be programmed to execute instructions stored in the one or more memory units 504 of the microcontroller unit 402 to pin a plurality of AC phase control or zero-crossing tasks to the second processor core 502 such that zero-crossing interrupts are handled exclusively by the second processor core 502.

For example, the second processor core 502 can execute the following code in order to pin certain AC phase control or zero-crossing tasks to the second processor core 502 (referred to below as core 1):

xTaskCreatePinnedToCore(&zero_task, "zero_task", 4096, NULL, 15, NULL, 1)

As a more specific example, the second processor core 502 can be programmed to execute instructions stored in the one or more memory units 504 to receive zero-crossing signals from the dimmer module 404 (e.g., from the first optocoupler 418) and transmit a plurality of switching signals to the second optocoupler 420 to work with the bidirectional triode thyristor 422 to modulate the power supplied to the lighting load 108 to dim the brightness of the lighting load 108 according to the dimming value 714.

One advantage of pinning separate tasks to the two processor cores is that the two processor cores can operate at full capacity without being interrupted at random. Another advantage of the dual-core architecture disclosed herein is that the PCB 400 of the light-dimming apparatus 100 is less complex and the light-dimming apparatus 100 as a whole is more cost-effective to manufacture.

In addition, an unexpected discovery made by the applicants is that a lighting load 108 dimmed by the dual-core microcontroller unit 402 disclosed herein (i.e., pinning wireless communication tasks to one CPU core and pinning zero-crossing tasks to another CPU core) exhibited less noticeable flickering than similar lighting loads dimmed by lighting systems or dimmers comprising microcontroller units having a single CPU core. Another unexpected discovery made by the applicants is that the light-dimming apparatus 100 timed out less often from a wireless connectivity standpoint than other wirelessly connected dimmers. This allows the light-dimming apparatus 100 and the lighting system 104 comprising the light-dimming apparatus 100 to operate for longer stretches without having to reset the light-dimming apparatus 100.

FIGS. 6A to 6C illustrate example waveforms of alternating current being phase controlled by the light-dimming apparatus 100. For example, phase diagram 600 in FIG. 6A illustrates an instance where the lighting load 108 is not dimmed (100% brightness) and full sinusoidal AC energy is delivered to the lighting load 108. Phase diagram 602 in FIG. 6B illustrates an instance where the lighting load 108 is dimmed to 75% brightness and partial sinusoidal AC energy is delivered to the lighting load 108. Phase diagram 604 in FIG. 6C illustrates an instance where the lighting load 108 is dimmed to 25% brightness and even less sinusoidal AC energy is delivered to the lighting load 108. Since the AC dimmer module 404 of the light-dimming apparatus 100 cuts from the forward phase, the light-dimming apparatus 100 can be considered a forward-phase dimmer.

Figure 7A:
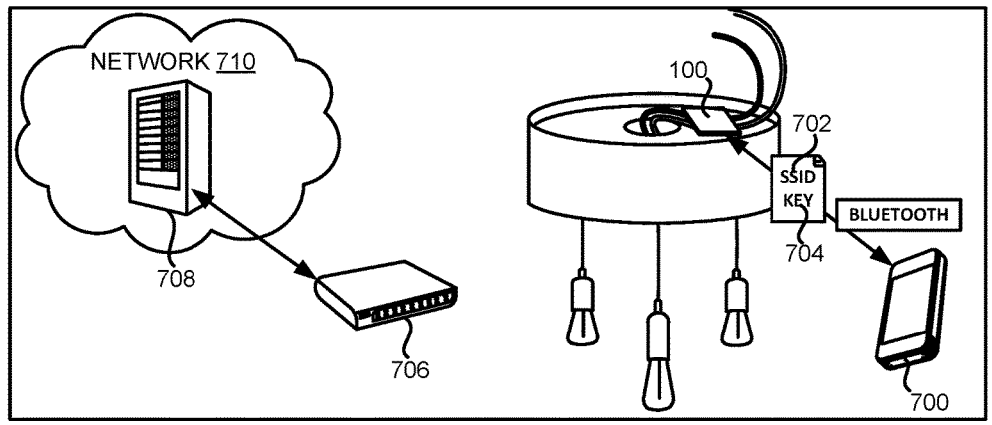
FIGS. 7A to 7C illustrate the light-dimming apparatus in operation.
Figure 7B:
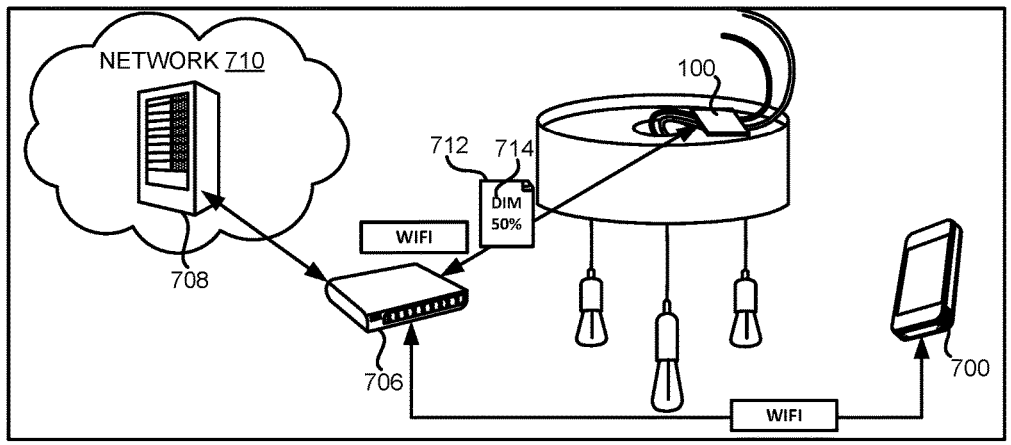
Figure 7C:
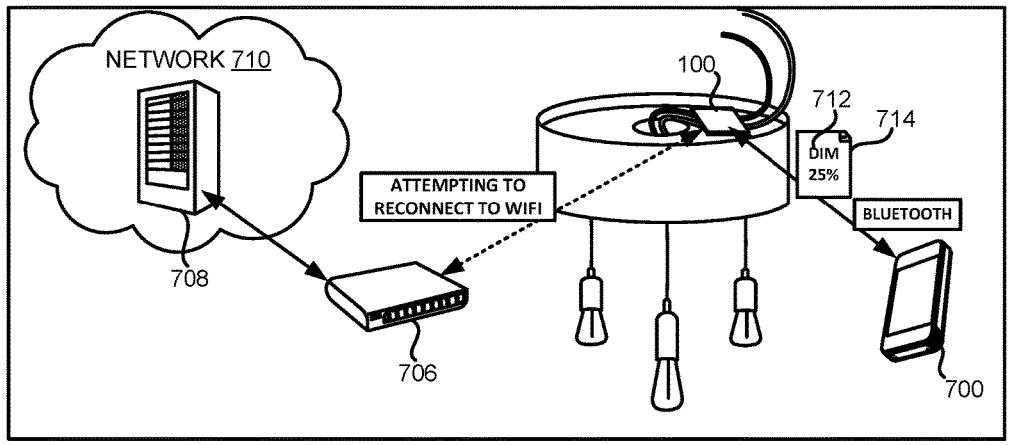

FIGS. 7A to 7C illustrate certain operations undertaken by the light-dimming apparatus 100. FIG. 7A illustrates a client device 700 provisioning the light-dimming apparatus 100 with credentials used to access a wireless local area network (WLAN). The light-dimming apparatus 100 can be considered to be in a reset mode prior to connecting to the WLAN. As depicted in FIG. 7A, the first processor core 500 of the microcontroller unit 402 of the light-dimming apparatus 100 can be programmed to execute instructions (e.g., firmware instructions) stored in the memory of the microcontroller unit 402 to receive a service set identifier (SSID) 702 of the WLAN and a network key 704 associated with the SSID 702 from the client device 700 over a Bluetooth™ communication protocol (e.g., BLE, Bluetooth™ BR/EDR, etc.). The first processor core 500 can then be programmed to execute further instructions to store the SSID 702 and the network key 704 in one of the memory units 504 of the microcontroller unit 402.

The first processor core 500 can also be programmed to execute instructions to wirelessly connect to the WLAN using the SSID 702 and the network key 704 through a wireless networking device 706, such as a wireless router or gateway device. Once the light-dimming apparatus 100 has successfully connected to the WLAN, the first processor core 500 can be further programmed to instruct the Bluetooth™ module 508 to cease communication services or to cease communicating with client devices 700 via a Bluetooth™ communication protocol (e.g., BLE, Bluetooth™ BR/EDR, etc.). In one embodiment, the first processor core 500 can be programmed to execute instructions stored in one of the memory units 504 of the microcontroller unit 402 to instruct the Bluetooth™ module 508 to cease communication services by ceasing a plurality of Generic Attribute Profile (GATT) services undertaken by the Bluetooth™ module 508.

For example, the first processor core 500 can execute the following code in order to instruct the Bluetooth™ module 508 to cease communication services once the light-dimming apparatus 100 is successfully connected to the WLAN via the wireless networking device 706 (e.g., wireless router):

case SYSTEM_EVENT_STA_GOT_IP: {xEventGroupSetBits(wifi_event_group, CONNECTED_BIT);
esp_wifi_get_mode(&mode);
if (wifi_alive==false)
{esp_ble_gatts_stop_service(gatts_gl_profile_tab [GATTS_PROFILE_SENSOR_ID].s ervice_handle);
wifi_alive=true;}

The light-dimming apparatus 100 can temporarily disable or turn off the Bluetooth™ module 508 in order to prevent unauthorized devices from connecting to the light-dimming apparatus 100 via Bluetooth™ once the light-dimming apparatus 100 has been configured. Moreover, once the light-dimming apparatus 100 is able to connect to the WLAN, the light-dimming apparatus 100 can receive commands from a server 708 via a wide area network (WAN) such as network 710 (e.g., the Internet). Once the Bluetooth™ module 508 is turned off or disabled, all control over the light-dimming apparatus 100 is then routed through the server 708.

The server 708 can be or refer to one or more centralized or stand-alone servers, de-centralized servers, or a combination thereof. For example, the server 708 can be or refer to a cloud computing resource, a virtualized computing resource, a part of a server farm, a server cluster, or a combination thereof. In some embodiments, the server 708 can take the form of a rack-mounted server, a blade server, a mainframe, a dedicated desktop or laptop computer, a portion thereof, one or more processors or processors cores therein, or a combination thereof.

In one embodiment, the client device 700 shown in FIGS. 7A to 7C can be or refer to a portable electronic device such as a smartphone, a tablet computer, a laptop computer, a smartwatch, a fitness tracker, or a combination thereof. In other embodiments, the client device 700 can be or refer to a desktop computer, a smart television, a smart home appliance, or a combination thereof.

The client device 700 can communicate with the server 708 by connecting to the WLAN via the wireless networking device 706. In other embodiments, the client device 700 can communicate with the server 708 through one or more cellular networks using one or more wireless communication protocols or standards such as a 3G wireless communication standard, a 4G wireless communication standard, a 5G wireless communication standard, a long-term evolution (LTE) wireless communication standard, or a combination thereof.

In further embodiments, a voice-enabled assistance device (e.g., Google Home™ Amazon Echo™, etc.) can also be wirelessly connected to the wireless networking device 706. In these embodiments, a user can voice a command to the voice-enabled assistance device to dim the lights. The voice-enabled assistance device can then transmit a parsed instance of the command to a voice-enabled assistance server via WiFi. The voice-enabled assistance server can then communicate with the server 708 to instruct the server 708 to transmit a dimming command 712 to the light-dimming apparatus 100.

FIG. 7B illustrates that the light-dimming apparatus 100 can receive a dimming command 712 comprising a dimming value 714 from the server 708. The light-dimming apparatus 100 can receive the dimming command 712 via a WiFi communication protocol through the wireless networking device 706. The dimming command 712 can be instructions transmitted as part of one or more network packets. The dimming value 714 can be a percentage value between 0% and 100%. As will be discussed in more detail in the following sections, the dimming command 712 can be sent from a client device 700 when a user applies a user input to a graphical user interface (GUI) of an application 800 (see FIGS. 8A to 8C) running on the client device 700.

In response to the first processor core 500 receiving the dimming command 712, the second processor core 502 of the microcontroller unit 402 can be programmed to execute instructions stored in one of the memory units 504 of the microcontroller unit 402 to receive a number of zero-crossing signals from the dimmer module 404 and transmit a plurality of switching signals to the second optocoupler 420 in response to the zero-crossing signals. The second optocoupler 420 can then work with the bidirectional triode thyristor 422 (or TRIAC) to modulate the power supplied to the lighting load 108 to dim the brightness of the lighting load 108.

FIG. 7C illustrates that the first processor core 500 can detect that the WiFi module 506 is disconnected from the WLAN (e.g., if the WiFi router is offline). The light-dimming apparatus 100 can enter a reset mode when disconnected from the WLAN. When in the reset mode, the first processor core 500 can instruct the Bluetooth™ module 508 to resume communication services upon detecting that the WiFi module 506 is disconnected from the WLAN.

The first processor core 500 can then use the Bluetooth™ module 508 to broadcast a device name or device hardware address to client devices within range of the light-dimming apparatus 100. The light-dimming apparatus 100 can then connect directly with at least one client device via a Bluetooth™ communication protocol (e.g., BLE, Bluetooth™ BR/EDR, etc.) through the Bluetooth™ module 508. At this point, the first processor core 500 can receive dimming commands 712 directly from the client device 700 or another client device via the Bluetooth™ communication protocol (e.g., BLE, Bluetooth™ BR/EDR, etc.) through the Bluetooth™ module 508. In response to the first processor core 500 receiving a dimming command 712 from the client device 700 via the Bluetooth™ communication protocol, the second processor core 502 can be programmed to execute instructions stored in one of the memory units 504 of the microcontroller unit 402 to receive zero-crossing signals from the dimmer module 404 and transmit a plurality of switching signals to the second optocoupler 420 to work with the bidirectional triode thyristor 422 to modulate the power supplied to the lighting load 108 to dim the brightness of the lighting load 108. The brightness of the lighting load 108 can be dimmed in accordance with the dimming value 714 received as part of the dimming command 712 from the client device 700 or another client device.

FIG. 7C also illustrates that the first processor core 500 can be programmed to execute instructions to attempt to wirelessly reconnect to the WLAN using the SSID 702 and the network key 704 stored in one of the memory units 504 of the microcontroller unit 402. The light-dimming apparatus 100 can simultaneously attempt to reconnect to the WLAN while also receiving dimming commands 712 directly from one or more client devices via a Bluetooth™ communication protocol.

Once the light-dimming apparatus 100 has successfully re-connected to the WLAN (e.g., when the wireless router comes back online after going offline for a short period), the light-dimming apparatus 100 can exit the reset mode and enter a normal operating mode. When the light-dimming apparatus 100 is successfully re-connected to the WLAN, the first processor core 500 can once again instruct the Bluetooth™ module 508 to cease communication services (e.g., by ceasing a number of GATT services) such that dimming commands 712 are once again routed through the server 708. One advantage of the connection methods described herein is that a user can still operate the lighting system 104 comprising the light-dimming apparatus 100 via the client device 700 using Bluetooth™ when a WiFi connection is down or otherwise unavailable. However, once the light-dimming apparatus 100 is able to re-connect to the WLAN, command of the light-dimming apparatus 100 is routed through the server 708 for added security and the ability to be able to remotely control the light-dimming apparatus 100 from any location with WiFi access.

FIGS. 8A to 8C illustrate example graphical user interfaces (GUIs) of a mobile application 800 running on a client device 700 used to control the light-dimming apparatus 100. In some embodiments, the mobile application 800 can be written or coded using the Swift™ programming language, the Objective-C programming language, or a combination thereof when the client device 700 is running an iOS™ operating system. In other embodiments, the mobile application 800 can be written or coded using the Java™ programming language when the client device 700 is running an Android™ operating system. A user can transmit commands to the server 708 to control the light-dimming apparatus 100 by applying a user input to one or more GUI elements rendered through the mobile application 800. The server 708 (or one or more server processors) can be programmed to execute instructions written in the Java™ programming language, Structured Query Language (SQL) programming language, or a combination thereof to interact and communicate with the client device 700 and the light-dimming apparatus 100.

FIG. 8A illustrates a device discovery GUI 802 rendered as part of the mobile application 800. The device discovery GUI 802 can be displayed to a user when at least one lighting system 104 comprising the light-dimming apparatus 100 is in the reset mode and within a short-range communication range (e.g., Bluetooth™ or BLE range) of the client device 700.

The client device 700 running the mobile application 800 can be programmed to execute application instructions to scan for a light-dimming apparatus 100 that is in the reset mode. A light-dimming apparatus 100 can be in the reset mode when the device has not been configured or provisioned for connection to a WLAN or has recently lost its connection to the WLAN. The device discovery GUI 802 will display a device name or device hardware address of the discovered light-dimming apparatus 100 through a discovered device button 804 or link. The client device 700 can attempt to connect to the discovered light-dimming apparatus 100 using a Bluetooth™ communication protocol (e.g., BLE, Bluetooth™ BR/EDR, etc.) when the user applies a user input to the discovered device button 804 or link. The mobile application 800 can then allow the user to enter provisioning credentials (e.g., the SSID 702 and the network key 704) for the WLAN through the mobile application 800 to be stored within one of the memory units 504 of the light-dimming apparatus 100. Moreover, the mobile application 800 can also allow the user to control the light-dimming apparatus 100 directly over the Bluetooth™ communication protocol.

FIG. 8B illustrates a light control GUI 806 rendered as part of the mobile application 800. The light control GUI 806 can be displayed when a user applies a user input to a specific light identification button 816 or link rendered as part of a lighting summary GUI 814 (see FIG. 8C). As shown in FIG. 8B, the user can turn on or turn off a lighting system 104 comprising the light-dimming apparatus 100 by applying a user input to an ON/OFF button 808 or link rendered as part of the light control GUI 806. In response to the user applying the user input to the ON/OFF button 808 or link, the client device 700 can transmit an ON/OFF command to the server 708 and the server 708 can, in turn, transmit the ON/OFF command to the light-dimming apparatus 100. In other embodiments, the client device 700 can transmit the ON/OFF command directly to the light-dimming apparatus 100 when the light-dimming apparatus 100 is in the reset mode and connected to the client device 700 directly over a Bluetooth™ communication protocol.

The user can also generate a dimming command 712 comprising a dimming value 714 by manipulating a dimming control slider 810 rendered as part of the light control GUI 806. In response to the user applying a user input to manipulate the dimming control slider 810, the client device 700 can transmit a dimming command 712 comprising a dimming value 714 corresponding to the slider position of the dimming control slider 810 to the server 708. The server 708 can, in turn, transmit the dimming command 712 to the light-dimming apparatus 100. In other embodiments, the client device 700 can transmit the dimming command 712 directly to the light-dimming apparatus 100 when the light-dimming apparatus 100 is in the reset mode and connected to the client device 700 directly over a Bluetooth™ communication protocol. In all such embodiments, the dimming command 712 and the dimming value 714 can be stored in at least one of the memory units 504 of the microcontroller unit 402 of the light-dimming apparatus 100 even when the lighting system 104 comprising the light-dimming apparatus 100 is turned off. The light-dimming apparatus 100 can then set the brightness or luminous intensity of the lighting load 108 to its previously saved dimming value 714 when the lighting system 104 is turned on once again.

FIG. 8B also illustrates that the light control GUI 806 can also comprise a schedule button 812 rendered as part of the light control GUI 806. In response to the user applying a user input to the schedule button 812, the client device 700 can transmit scheduling instructions to the server 708. The scheduling instructions can be stored in one or more server memory units. The server 708 can generate and transmit ON/OFF commands, dimming commands 712, or a combination thereof to the light-dimming apparatus based on a number of scheduling parameters (e.g., day-of-the week, time-of-the-day, duration, etc.) of the scheduling instructions. By doing so, a user can schedule lighting operations to be undertaken by the light-dimming apparatus 100 in advance.

FIG. 8C illustrates a light summary GUI 814 comprising a plurality of light identification buttons 816. Each of the light identification buttons 816 can be associated with a lighting system 104 comprising a light-dimming apparatus 100. A user can apply a user input to a particular light identification button 816 to bring up the light control GUI 806 for that particular lighting system 104.

Figure 9A:
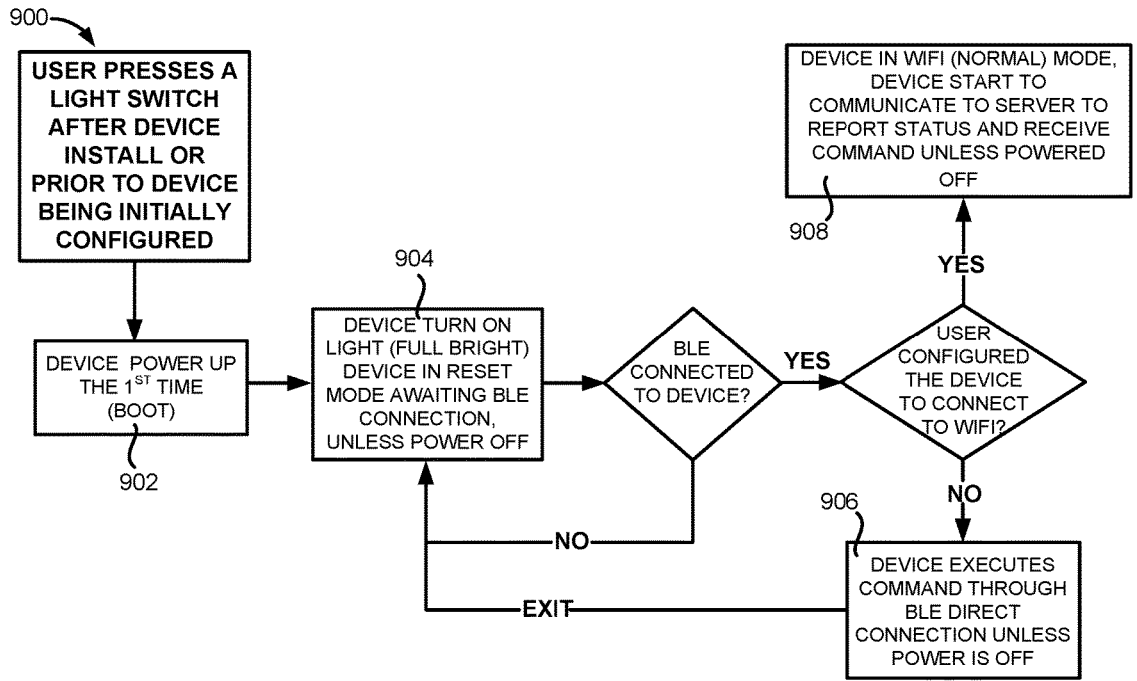
FIG. 9A is a flowchart of an example operating procedure undertaken by the light-dimming apparatus after a user turns on a light fixture comprising the light-dimming apparatus for the first time.

FIG. 9A illustrates a flowchart depicting one embodiment of an operating procedure 900 undertaken by the light-dimming apparatus 100. The procedure 900 can be undertaken by the light-dimming apparatus 100 when a user presses a light switch (e.g., a wall-mounted lighting control 120, such as the one shown in FIG. 1A) after the lighting system 104 has been installed or prior to the initial configuration of the light-dimming apparatus 100. The light-dimming apparatus 100 can power up or boot up for the first time in response to the user pressing a light switch in operation 902. The light-dimming apparatus 100 can then allow full sinusoidal AC energy to be delivered to the lighting load 108 (i.e., turn on the light to 100% or full brightness) when the light-dimming apparatus 100 is still in a reset mode and awaiting a connection with a client device 700 over BLE or another Bluetooth™ communication protocol in operation 904.

If the light-dimming apparatus 100 is directly connected to a client device 700 via BLE or another Bluetooth™ communication protocol but not connected to a WLAN, the light-dimming apparatus 100 can execute instructions or commands (dimming commands 712, ON/OFF commands, or a combination thereof) received directly from the client device 700 in operation 906. Alternatively, if the light-dimming apparatus 100 receives provisioning credentials (e.g., SSID 702 and network key 704 associated with a WLAN) from the client device 700, the light-dimming apparatus 100 can enter a normal operating mode and connect with the server 708 over WiFi in operation 908. While in the normal operating mode, the light-dimming apparatus 100 can receive all instructions and commands from the server 708 and execute instructions to turn off the Bluetooth™ module 508 for security purposes and for operational efficiency.

Figure 9B:
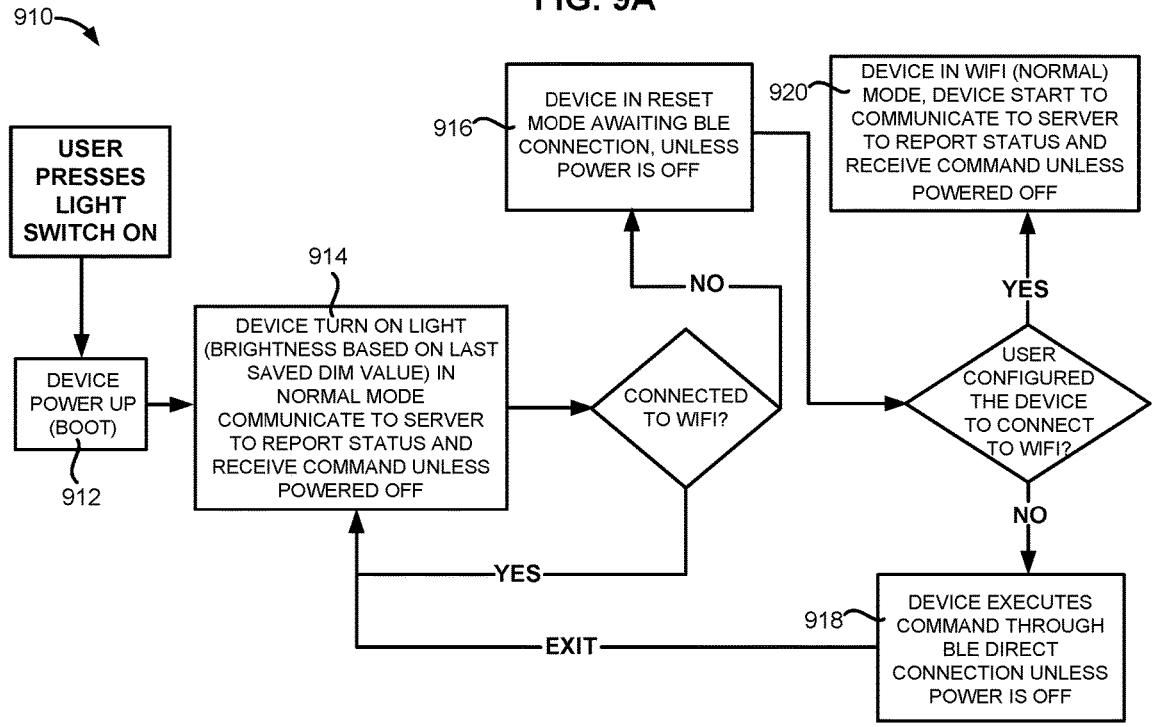
FIG. 9B is a flowchart of another example operating procedure undertaken by the light-dimming apparatus after a user turns on the light-fixture comprising the light-dimming apparatus after the lighting-dimming apparatus has been configured.

FIG. 9B illustrates a flowchart depicting an embodiment of another operating procedure 910 undertaken by the light-dimming apparatus 100 after the user turns on the lighting system 104 and the light-dimming apparatus 100 has been previously configured. The procedure 910 can comprise the light-dimming apparatus 100 powering up or booting up in response to the user pressing the light switch in operation 912. The light-dimming apparatus 100 can then turn on the lighting system 104 by setting the brightness of the lighting load 108 to a previously saved dimming value 714 in operation 914. The light-dimming apparatus 100 can then query if it is connected to a WLAN. If the light-dimming apparatus 100 is connected to the WLAN, the light-dimming apparatus 100 can enter a normal operating mode and connect with the server 708 over WiFi. However, if the light-dimming apparatus 100 is not connected to the WLAN, the light-dimming apparatus 100 can enter a reset mode and await a connection with a client device 700 over BLE or another Bluetooth™ communication protocol in operation 916. If the light-dimming apparatus 100 is directly connected to a client device 700 over BLE or another Bluetooth™ communication protocol but has not received provisioning credentials (e.g., SSID 702 and network key 704 associated with a WLAN) from the client device 700, the light-dimming apparatus 100 can execute instructions or commands (dimming commands 712, ON/OFF commands, or a combination thereof) received directly from the client device 700 in operation 918. If the light-dimming apparatus 100 has received provisioning credentials (e.g., SSID 702 and network key 704 associated with a WLAN) from the client device 700 and has successfully connected to the WLAN, the light-dimming apparatus 100 can enter a normal operating mode and connect with the server 708 over WiFi in operation 920. While in a normal operating mode, the light-dimming apparatus 100 can receive all instructions and commands from the server 708 and execute instructions to turn off the Bluetooth™ module 508 for security purposes and for operational efficiency.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein.

All existing subject matter mentioned herein (e.g., publications, patents, and patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A light-dimming apparatus for placement within a lighting enclosure of a lighting fixture, the light-dimming apparatus comprising:

an AC live input terminal configured to couple to an AC live input wire from a power source, an AC neutral input terminal configured to couple to an AC neutral input wire, an AC live output terminal configured to couple to an AC live output wire coupled to a lighting load, and an AC neutral output terminal configured to couple to an AC neutral output wire coupled to the lighting load;

a microcontroller unit comprising a plurality of wireless communication modules, a first processor core, a second processor core, and a memory;

an alternating current-to-direct current (AC-to-DC) buck converter coupled to the AC live input terminal, the AC neutral input terminal, and the microcontroller unit and configured to deliver power to the microcontroller unit;

a dimmer module configured to detect a zero-crossing signal and modulate power supplied to the lighting load, wherein the dimmer module comprises:

a full bridge rectifier electrically coupled to at least the AC live input terminal and the AC neutral input terminal, a first optocoupler electrically coupled to at least the full bridge rectifier and the microcontroller unit,
a bidirectional triode thyristor coupled to at least the AC live output wire,
a second optocoupler coupled to at least the microcontroller unit and the bidirectional triode thyristor;
wherein the first processor core of the microcontroller unit is programmed to execute instructions stored in the memory of the microcontroller unit to receive a dimming command comprising a dimming value from another device via at least one of the plurality of wireless communication modules to dim a brightness of the lighting load; and
wherein the second processor core of the microcontroller unit is programmed to execute further instructions stored in the memory of the microcontroller unit to receive zero-crossing signals from the dimmer module and transmit a plurality of switching signals to the second optocoupler to work with the bidirectional triode thyristor to modulate the power supplied to the lighting load to dim the brightness of the lighting load according to the dimming value.

2. The light-dimming apparatus of claim 1, wherein the plurality of wireless communication modules comprise a wireless-fidelity (WiFi) module and a Bluetooth™ module.

3. The light-dimming apparatus of claim 2, wherein the first processor core is further programmed to execute instructions stored in the memory of the microcontroller unit to:
receive a service set identifier (SSID) of a wireless local area network (WLAN) and a network key associated with the SSID from a client device communicatively coupled to the microcontroller unit over a Bluetooth™ communication protocol via the Bluetooth™ module;
store the SSID and the network key in the memory of the microcontroller unit;
wirelessly connect to the WLAN using the SSID and the network key;
instruct the Bluetooth™ module to cease communication services upon successfully connecting to the WLAN;
receive the dimming command comprising the dimming value from a server over a WiFi communication protocol; and
wherein the second processor core is programmed to execute instructions stored in the memory of the microcontroller unit to receive the zero-crossing signals from the dimmer module and transmit the plurality of switching signals to the second optocoupler to work with the bidirectional triode thyristor to modulate the power supplied to the lighting load to dim the brightness of the lighting load according to the dimming value received from the server.

4. The light-dimming apparatus of claim 3, wherein the first processor core is further programmed to execute instructions stored in the memory of the microcontroller unit to instruct the Bluetooth™ module to cease communication services by ceasing a plurality of Generic Attribute Profile (GATT) services undertaken by the Bluetooth™ module.

5. The light-dimming apparatus of claim 3, wherein the first processor core is further programmed to execute instructions stored in the memory of the microcontroller unit to:
detect that the WiFi module is disconnected from the WLAN;
instruct the Bluetooth™ module to resume communication services upon detecting that the WiFi module is disconnected from the WLAN;
broadcast a device name of the light-dimming apparatus to client devices within range of the Bluetooth™ module while simultaneously attempting to wirelessly reconnect to the WLAN using the SSID and the network key stored in the memory of the microcontroller unit;
wirelessly reconnect to the WLAN using the SSID and the network key stored in the memory of the microcontroller unit; and
instruct the Bluetooth™ module to once again cease communication services upon successfully connecting to the WLAN.

6. The light-dimming apparatus of claim 3, wherein the first processor core is further programmed to execute instructions stored in the memory of the microcontroller unit to:
detect that the WiFi module is disconnected from the WLAN;
instruct the Bluetooth™ module to resume communication services upon detecting that the WiFi module is disconnected from the WLAN;
receive another dimming command comprising another dimming value from the same client device or another client device wirelessly connected to the light-dimming apparatus via the Bluetooth™ module; and
wherein the second processor core is programmed to execute instructions stored in the memory of the microcontroller unit to receive other zero-crossing signals from the dimmer module and transmit additional switching signals to the second optocoupler to work with the bidirectional triode thyristor to modulate the power supplied to the lighting load to dim the brightness of the lighting load according to the dimming value received from the same client device or another client device.

7. The light-dimming apparatus of claim 1, wherein the lighting enclosure comprises at least one of a canopy of the AC powered light, a sconce of the AC powered light, a flush-mount of the AC powered light, a shade holder of the AC powered light, and an electrical distribution box of an outdoor AC powered light.

8. The light-dimming apparatus of claim 1, wherein each of the first processor core and the second processor core of the microcontroller unit is a 32-bit microprocessor operating at a clock frequency of between 160 MHz and 240 MHz.

9. The light-dimming apparatus of claim 1, wherein the lighting load comprises at least one of an incandescent light bulb, a halogen light bulb, a dimmable light-emitting diode (LED) light bulb, and a dimmable compact fluorescent lamp (CFL) light bulb.

10. The light-dimming apparatus of claim 1, wherein the first processor core is further programmed to execute instructions stored in the memory of the microcontroller unit to pin a plurality of wireless communication tasks to the first processor core such that the wireless communication tasks are handled by the first processor core, and wherein the second processor core is further programmed to execute instructions stored in the memory of the microcontroller unit to pin a plurality of zero-crossing tasks to the second processor core such that zero-crossing interrupts are handled by the second processor core.

11. A lighting system, comprising:
a light socket configured to couple to a lighting load;
a lighting enclosure coupled to the light socket, wherein the lighting enclosure is configured to house a light-dimming apparatus, wherein the light-dimming apparatus comprises:
an alternating current (AC) live input terminal configured to couple to an AC live input wire from a power source, an AC neutral input terminal configured to couple to an AC neutral input wire, an AC live output terminal configured to couple to an AC live output wire coupled to the lighting load, and an AC neutral output terminal configured to couple to an AC neutral output wire coupled to the lighting load;
a microcontroller unit comprising a plurality of wireless communication modules, a first processor core, a second processor core, and a memory;
an alternating current-to-direct current (AC-to-DC) buck converter coupled to the AC live input terminal, the AC neutral input terminal, and the microcontroller unit and configured to deliver power to the microcontroller unit;
a dimmer module configured to detect zero-crossing signals and modulate power supplied to the lighting load, wherein the dimmer module comprises:
a full bridge rectifier electrically coupled to at least the AC live input terminal and the AC neutral input terminal,
a first optocoupler electrically coupled to at least the full bridge rectifier and the microcontroller unit,
a bidirectional triode thyristor coupled to at least the AC live output wire,
a second optocoupler coupled to at least the microcontroller unit and the bidirectional triode thyristor;
wherein the first processor core of the microcontroller unit is programmed to execute instructions stored in the memory of the microcontroller unit to receive a dimming command comprising a dimming value from another device via at least one of the plurality of wireless communication modules to dim a brightness of the lighting load; and
wherein the second processor core of the microcontroller unit is programmed to execute further instructions stored in the memory of the microcontroller unit to receive the zero-crossing signals from the dimmer module and transmit a plurality of switching signals to the second optocoupler to work with the bidirectional triode thyristor to modulate the power supplied to the lighting load to dim the brightness of the lighting load according to the dimming value.

12. The lighting system of claim 11, wherein the plurality of wireless communication modules comprise a wireless-fidelity (WiFi) module and a Bluetooth™ module.

13. The lighting system of claim 12, wherein the first processor core is further programmed to execute instructions stored in the memory of the microcontroller unit to:
receive a service set identifier (SSID) of a wireless local area network (WLAN) and a network key associated with the SSID from a client device communicatively coupled to the microcontroller unit over a Bluetooth™ communication protocol via the Bluetooth™ module;
store the SSID and the network key in the memory of the microcontroller unit;
wirelessly connect to the WLAN using the SSID and the network key;
instruct the Bluetooth™ module to cease communication services upon successfully connecting to the WLAN;
receive a dimming command comprising a dimming value from a server over a WiFi communication protocol; and
wherein the second processor core is programmed to execute instructions stored in the memory of the microcontroller unit to receive the zero-crossing signals from the dimmer module and transmit the plurality of switching signals to the second optocoupler to work with the bidirectional triode thyristor to modulate the power supplied to the lighting load to dim the brightness of the lighting load according to the dimming value received from the server.

14. The lighting system of claim 13, wherein the first processor core is further programmed to execute instructions stored in the memory of the microcontroller unit to instruct the Bluetooth™ module to cease communication services by ceasing a plurality of Generic Attribute Profile (GATT) services undertaken by the Bluetooth™ module.

15. The lighting system of claim 13, wherein the first processor core is further programmed to execute instructions stored in the memory of the microcontroller unit to:
detect that the WiFi module is disconnected from the WLAN;
instruct the Bluetooth™ module to resume communication services upon detecting that the WiFi module is disconnected from the WLAN;
broadcast a device name of the light-dimming apparatus to client devices within range of the Bluetooth™ module while simultaneously attempting to wirelessly reconnect to the WLAN using the SSID and the network key stored in the memory of the microcontroller unit;
wirelessly reconnect to the WLAN using the SSID and the network key stored in the memory of the microcontroller unit; and
instruct the Bluetooth™ module to once again cease communication services upon successfully connecting to the WLAN.

16. A method of dimming an alternating current (AC)-powered light, the method comprising:
executing instructions stored in a memory of a microcontroller unit of a light-dimming apparatus using a first processor core of the microcontroller unit to receive a dimming command comprising a dimming value via at least one of a wireless-fidelity (WiFi) module and a Bluetooth™ module of the microcontroller unit from another device to dim a brightness of a lighting load, wherein the light-dimming apparatus further comprises:
an AC live input terminal configured to couple to an AC live input wire from a power source, an AC neutral input terminal configured to couple to an AC neutral input wire, an AC live output terminal configured to couple to an AC live output wire coupled to the lighting load, and an AC neutral output terminal configured to couple to an AC neutral output wire coupled to the lighting load,
an alternating current-to-direct current (AC-to-DC) buck converter coupled to the AC live input terminal, the AC neutral input terminal, and the microcontroller unit and configured to deliver power to the microcontroller unit, and
a dimmer module configured to detect zero-crossing signals and modulate power supplied to the lighting load, wherein the dimmer module comprises:
a full bridge rectifier electrically coupled to at least the AC live input terminal and the AC neutral input terminal,
a first optocoupler electrically coupled to at least the full bridge rectifier and the microcontroller unit, a bidirectional triode thyristor coupled to at least the AC live output wire, a second optocoupler coupled to at least the microcontroller unit and the bidirectional triode thyristor; and executing further instructions stored in the memory of the microcontroller unit using a second processor core of the microcontroller unit to receive the zero-crossing signals from the dimmer module and transmit a plurality of switching signals to the second optocoupler to work with the bidirectional triode thyristor to modulate the power supplied to the lighting load to dim the brightness of the lighting load according to the dimming value.

17. The method of claim 16, further comprising executing instructions stored in the memory of the microcontroller unit using the first processor core, wherein the instructions comprise the steps of:

receiving a service set identifier (SSID) of a wireless local area network (WLAN) and a network key associated with the SSID from a client device communicatively coupled to the microcontroller unit over a Bluetooth™ communication protocol via the Bluetooth™ module;

storing the SSID and the network key in the memory of the microcontroller unit;

wirelessly connecting to the WLAN using the SSID and the network key;

instructing the Bluetooth™ module to cease communication services upon successfully connecting to the WLAN;

receiving the dimming command comprising the dimming value from a server over a WiFi communication protocol; and executing instructions stored in the memory of the microcontroller unit using the second processor core, wherein the instructions comprise the steps of receiving the zero-crossing signals from the dimmer module and transmitting the plurality of switching signals to the second optocoupler to work with the bidirectional triode thyristor to modulate the power supplied to the lighting load to dim the brightness of the lighting load according to the dimming value received from the server.

18. The method of claim 17, further comprising executing instructions stored in the memory of the microcontroller unit using the first processor core, wherein the instructions comprise the steps of instructing the Bluetooth™ module to cease communication services by ceasing a plurality of Generic Attribute Profile (GATT) services undertaken by the Bluetooth™ module.

19. The method of claim 17, further comprising executing instructions stored in the memory of the microcontroller unit using the first processor core, wherein the instructions comprise the steps of:

detecting that the WiFi module is disconnected from the WLAN;

instructing the Bluetooth™ module to resume communication services upon detecting that the WiFi module is disconnected from the WLAN;

broadcasting a device name of the light-dimming apparatus to client devices within range of the Bluetooth™ module while simultaneously attempting to wirelessly reconnect to the WLAN using the SSID and the network key stored in the memory of the microcontroller unit;

wirelessly reconnecting to the WLAN using the SSID and the network key stored in the memory of the microcontroller unit; and instructing the Bluetooth™ module to once again cease communication services upon successfully connecting to the WLAN.

20. The method of claim 17, further comprising executing instructions stored in the memory of the microcontroller unit using the first processor core, wherein the instructions comprise the steps of:

detecting that the WiFi module is disconnected from the WLAN;

instructing the Bluetooth™ module to resume communication services upon detecting that the WiFi module is disconnected from the WLAN;

receiving another dimming command comprising another dimming value from the same client device or another client device wirelessly connected to the light-dimming apparatus via the Bluetooth™ module; and executing instructions stored in the memory of the microcontroller unit using the second processor core, wherein the instructions comprise the steps of receiving other zero-crossing signals from the dimmer module and transmitting additional switching signals to the to the second optocoupler to work with the bidirectional triode thyristor to modulate the power supplied to the lighting load to dim the brightness of the lighting load according to the dimming value received from the same client device or another client device.

* * * * *